(12) United States Patent
Tullos et al.

(10) Patent No.: US 6,914,103 B2
(45) Date of Patent: Jul. 5, 2005

(54) POWDER COATING COMPOSITION, METHOD FOR THE CURING THEREOF, AND ARTICLES DERIVED THEREFROM

(75) Inventors: Tina L. Tullos, Reading, PA (US); Gordon L. Tullos, Reading, PA (US); Brian T. Myers, Bloomsburg, PA (US); Charles P. Tarnoski, Sinking Spring, PA (US)

(73) Assignee: Rohm and Haas Company, Philadelphia, PA (US)

( * ) Notice: Subject to any disclaimer, the term of this patent is extended or adjusted under 35 U.S.C. 154(b) by 150 days.

(21) Appl. No.: 10/267,198

(22) Filed: Oct. 9, 2002

(65) Prior Publication Data

US 2003/0124248 A1 Jul. 3, 2003

Related U.S. Application Data

(60) Provisional application No. 60/328,587, filed on Oct. 11, 2001.

(51) Int. Cl.$^7$ ............................................. C08F 283/10
(52) U.S. Cl. ....................................... 525/530; 525/107
(58) Field of Search .................................. 525/107, 530

(56) References Cited

U.S. PATENT DOCUMENTS

| | | | |
|---|---|---|---|
| 5,684,067 A | | 11/1997 | Muthiah et al. ............. 525/453 |
| 6,218,483 B1 | * | 4/2001 | Muthiah et al. ............. 525/526 |
| 6,299,716 B1 | * | 10/2001 | Bettinger ..................... 156/85 |

FOREIGN PATENT DOCUMENTS

| | | |
|---|---|---|
| EP | 0 044 030 B1 | 10/1984 |
| EP | 0 072 371 B1 | 8/1985 |
| EP | 0214448 B1 | 1/1992 |
| EP | 0465176 B1 | 5/1996 |
| EP | 1034849 A2 | 9/2000 |

OTHER PUBLICATIONS

Misev, Tosko Aleksandar, *Powder Coatings Chemistry and Technology*, Wiley & Sons, West Sussex, England, 1991, pp. 138–145, 170–173.

Salitros, James et al, Gloss Modification Of Thermoset Powder Coatings With Styrene, Maleic Anhydride Copolymers, *Water–Borne, Higher–Solids and Powder Coatings Symposium, New Orleans, LA*, Feb. 1992, pp. 517–526.

Schmidhauser, John et al; "The Role Of Catalysts in Low–Gloss Epoxy/Polyester Hybrid Powder Coatings", *International Waterborne, High Solids, and Powder Coatings Symposium, New Orleans, LA*, Feb. 21–23, 2001, pp. 391–404.

Chetcuti, Peter A. et al; "Matting Agents For Powder Coatings", *Waterborne & Higher–Solids, and Powder Coatings Symposium, New Orleans*, LA ;Feb. 9–11, 1994; pp 685–701.

Sartomer Products For Powder Coatings, "Powder Coatings", SMA® Resins (no Date Available).

Ciba Specialty Chemicals, "Matting Agents/Hardeners for Powder Coatings", pp 1–10, 1998.

Howell, David; *The Technology, Formulation and Application of Powder Coatings*, vol 1, Chapter V, Wiley & Sons, London, 2000, pp. 152–179.

Chetcuti, Peter, A. et al. "Matting Agents for Powder Coatings Expand Gloss Range": Ciba Polymers, Hawthorne, NY., Aug. 1995, pp. 1–4.

Estron Chemical, Inc.; "Epomatt™ G–151", Jul. 25, 1997, pp 1–5.

Estron Chemical, Inc.; "Epomatt™ G–151", Technical Brief #1, Aug. 24, 1999 pp 1–7.

Estron Chemical, Inc.; "Epomatt™ G–151", Technical Brief #2, Aug. 24, 1999 pp. 1–2.

* cited by examiner

Primary Examiner—Kuo-Liang Peng
(74) Attorney, Agent, or Firm—Andrew E. C. Merriam

(57) ABSTRACT

A powder coating composition includes an epoxy resin and a styrene-maleic anhydride copolymer having a glass transition temperature less than 105° C. The compositions provide low gloss finishes at low curing temperatures, as well as consistent gloss over a wide range of curing temperatures.

16 Claims, No Drawings

POWDER COATING COMPOSITION, METHOD FOR THE CURING THEREOF, AND ARTICLES DERIVED THEREFROM

CROSS REFERENCE TO RELATED PATENT APPLICATIONS

This is a non-provisional application of prior pending U.S. provisional application Ser. No. 60/328,587 filed Oct. 11, 2001.

BACKGROUND

The present invention relates to a powder coating composition capable of providing a matte or low gloss finish on a variety of substrates. The gloss of a cured powder coating is typically described using terms including "matte", "low gloss", and "mid gloss" finishes. In general, gloss is expressed as a percentage of intensity of the reflected light with respect to the intensity of the incident light at a specified angle between the incident light beam and the planar test surface. The terms "matte", "low gloss", and "mid gloss" are defined herein according gloss measured according to ASTM D523 at an angle of 60°. Specifically, a "matte" finish has a 60° gloss less than 20 units; a "low gloss" finish has a 60° gloss of 20 to less than 40 units; and a "mid gloss" finish has a 60° gloss of 40 to less than 60 units.

Gloss reduction in powder coatings may be achieved by producing a fine surface morphology that scatters incident light, resulting in a lower percentage of reflected light. This low percentage of reflected light gives the appearance of matte or reduced gloss. A variety of methods have been developed to provide low gloss powder coatings, including the incorporation of fillers or extenders, the incorporation of incompatible ingredients such as waxes, dry blending of different formulations, and through the incorporation of matting agents.

The incorporation of fillers or extenders has been used to produce gloss in the mid-gloss range, however this technique does not readily provide for coatings to be produced with a smooth matte or low gloss finish. Also, the incorporation of fillers can lead to coatings with reduced physical properties including impact, flexibility, and adhesion due to reduced binder concentrations.

The incorporation of incompatible ingredients such as waxes is also commonly used to produce mid gloss finishes. As with the incorporation of extenders, this technique does not readily provide for coatings with matte or low gloss. Incorporation of waxes often leads to the formation of a surface film as waxes migrate over time, and removal of the surface film can expose a glossy surface underneath.

Dry blending of two powders that have different reactivities or are immiscible has been described in, for example, U.S. Pat. No. 3,842,035 to Klaren. Dry blending requires an additional manufacturing step and the resulting dry blended components can separate over time in a conventional powder coating application and recycle process. The separation of components during the application and recycle process can yield fluctuations in gloss and curing efficiency.

The incorporation of matting agents has also been used to provide a coating with matte or low gloss appearance. The underlying process has been described as one of competing reactions or varying rates of separate reactions. The use of reactive matting agents is described in, for example, European Patent Application Nos. 72,371 A1 to Holderegger et al., and 44,030 A1 to Gude et al.; European Patent Nos. 165,207 B1 and 366,608 B1 to Lauterbach; U.S. Pat. No. 5,684,067 to Muthiah et al., U.S. Pat. No. 5,786,419 to Meier-Westhues et al.; D. H. Howell in "The Technology, Formulation and Application of Powder Coatings", J. D. Sanders, Ed., John Wiley and Sons in association with SITA Technology Limited: London, England 2000. Vol. 1, pages 152–178; C. Grob and C. Rickert (2000) *Water-Borne, Higher-Solids, and Powder Coatings Symposium*, New Orleans, 1–3 Mar. 2000, pp 337–349; P. A. Chetcuti, B. Dreher, and P. Gottis, *Mod Paint Coatings* (1995), volume 85, no. 7, pages 28–32; J. J. Salitros and R. Patarcity, *Proc. Water-Borne, Higher-Solids, Powder Coat. Symp.* (1992), 19th, pages 517–526; and J. Schmidhauser and J. Havard, *Proc. Int. Waterborne, High-Solids, Powder Coat. Symp.* (2001), 28th, 391–404.

Gloss has been lowered in epoxy powder coating systems by using reactive matting agents such as cyclic amidines and amidine salts as described, for example, in European Patent Application No. 44,030 to Gude et al., and in Ciba-Geigy Product Literature "Matting Agents/Hardeners for Powder Coatings". This is commonly known as "veba" technology.

Another approach is the addition of acid anhydride containing materials, addition of polyacids, or by dry blending two powder coatings with different reactivities as described in U.S. Pat. No. 3,842,035 to Klaren. Howell, cited above, refers to the incorporation of reactive matting in powder coatings to achieve low gloss and states that gloss level of less than 20% are attainable but depend on the curing conditions, which have to be carefully controlled in order to ensure reproducibility.

Examples of acid functional reactive matting agents used in epoxy systems and polyester/epoxy hybrid systems include styrene maleic anhydride copolymers or esterified styrene maleic anhydride copolymers as described in the Salitros et al. and Schmidhauser et al. references cited above. The styrene-maleic anhydride copolymers are described as functioning as matting agents at cure temperatures of at least 400° F. in polyester/epoxy hybrid systems.

There remains a need for a coating composition that provides low gloss at low curing temperatures and consistently provides low gloss or matte gloss over a broad temperature range.

BRIEF SUMMARY

The above-described and other drawbacks and disadvantages of the prior art are alleviated by a curable powder coating composition, comprising: an epoxy thermosetting resin; and a matting agent selected from styrene-maleic anhydride copolymers having a glass transition temperature less than 105° C.

Other embodiments, including a method of forming a cured powder coating, are described in detail below.

DETAILED DESCRIPTION OF THE PREFERRED EMBODIMENTS

One embodiment is a powder coating composition comprising: an epoxy thermoset resin; and a matting agent selected from styrene-maleic anhydride copolymers having a glass transition temperature less than 105° C.

The composition comprises an epoxy thermoset resin, hereinafter referred to as an epoxy resin. The glass transition temperature ($T_g$) of the epoxy resins is preferably high enough that the particles do not fuse together or sinter at temperatures likely to be encountered during transportation and storage. Preferably, the $T_g$ is at least 50° C., more preferably at least 60° C.

Suitable epoxy resins include those containing aliphatic or aromatic backbones with oxirane functionality. They may be formed by the reaction of a diol and a halohydrin. Examples include the diglycidyl ether condensation polymers resulting from the reaction of epichlorohydrin with a bisphenol in the presence of an alkaline catalyst. Bisphenol A is most commonly used but the bisphenols B, F, G, AF, S and H are also suitable. Generally, the bisphenol A type epoxies may be of the type 1 to type 9 form, with the low viscosity type 3 or less epoxy resins being preferred. By controlling the operating conditions and varying the ratio of the reactants, products of various equivalent weights can be made. It may be preferred that the epoxide equivalent weight (EEW) may be 400 to 2,250 atomic mass units (AMU). Within this range, an EEW of at least 550 AMU may be preferred. Also within this range, an EEW of up to 1,100 AMU may be preferred, and an EEW of up to 750 may be more preferred.

Epoxy resins are available from a wide variety of commercial sources. Useful epoxy resins include the bisphenol A epoxy resins available from Vantico as ARALDITE® GT-7004, GT-7013 (type 3), GT-7014, GT-7072 (type 2), GT-7074, GT-7097, and the like. Bisphenol A epoxy resins further include those available from Shell Chemical Company as EPON® 1007F, EPON® 1009F, EPON® 1004, and the like. Suitable epoxy resins further include the epoxy phenol novolac resins available from Vantico as ARALDITE® GT-7220, and the epoxy cresol novolac resins available from Vantico as ARALDITE® GT-6259.

The powder coating composition further comprises a styrene-maleic anhydride resin having a glass transition temperature ($T_g$) less than 105° C. A $T_g$ of 40° C. to 105° C. is preferred. Within this range, the $T_g$ may preferably be at least 45° C. Also within this range, the $T_g$ may preferably be up to 100° C., more preferably up to 90° C., yet more preferably up to 80° C. The styrene-maleic anhydride resin may preferably have a mole ratio of styrene:maleic anhydride of 1:1 to 4:1.

Suitable styrene-maleic anhydride resins include unmodified styrene-maleic anhydride resins, partially or fully monoesterified styrene-maleic anhydride resins (in which one of the two carbonyls on each maleic anhydride is present as a partially or fully esterified carboxylic acid and the other is present as a free carboxylic acid), partially or fully diesterified styrene-maleic anhydride resins (in which both of the carbonyls on each maleic anhydride are present as partially or fully esterified carboxylic acids), and mixtures comprising at least one of the foregoing resins. Preferred ester groups may be formed by reaction of an unmodified styrene-maleic anhydride with an alcohol having 4 to 24 carbon atoms.

The acid number of the styrene/maleic anhydride resin is preferably 100 to 320 mg KOH/g. Within this range, the acid number may preferably be at least 110 mg KOH/g. Also within this range, the acid number may preferably be up to 210 mg KOH/g.

Suitable styrene-maleic anhydride resins include, for example, the partially monoesterified styrene-maleic anhydride copolymer obtained as SMA® 1440F from Sartomer, having a styrene:maleic anhydride mole ratio of 1:1, a glass transition temperature of 55° C., an acid number of 165–205, 55–75% monoesterification, and melt viscosities of 300 poise at 160° C., 110 poise at 180° C., and 70 poise at 200° C.; the partially monoesterified styrene-maleic anhydride copolymer obtained as SMA® X.10840 from Sartomer, having a styrene:maleic anhydride mole ratio of 1:1, a number average molecular weight of 2,640 AMU, a weight average molecular weight of 5,600 AMU, a glass transition temperature of 85° C., an acid number of 240, 65% monoesterification, and viscosities of 1,700 poise at 160° C., 420 poise at 180° C., and 140 poise at 200° C.; the partially monoesterified styrene-maleic anhydride copolymer obtained as SMA® X.11825 from Sartomer, having a styrene:maleic anhydride mole ratio of 1:1, a glass transition temperature of 110° C., an acid number of 315, 25% monoesterification, a weight average molecular weight of 3,200 AMU, and a number average molecular weight of 6,800 AMU; and the partially esterified styrene-maleic anhydride copolymer obtained as SMA® X.11850 from Sartomer, having a styrene:maleic anhydride mole ratio of 1:1, a glass transition temperature of 90° C., an acid number of 215, 50% monoesterification; a number average molecular weight of 3,800 AMU, and a weight average molecular weight of 8,300 AMU. Preferred styrene-maleic anhydride resins include the partially monoesterified styrene-maleic anhydride copolymer obtained as SMA® 1440F from Sartomer.

The composition may comprise the styrene-maleic anhydride resin in an amount of 3 to 30 parts by weight per 100 parts by weight of the epoxy resin. Within this range, the styrene-maleic anhydride resin amount may preferably be at least 5 parts by weight. Also within this range, the styrene-maleic anhydride amount may preferably be up to 20 parts by weight.

The composition may, optionally, comprise a curing agent. Suitable curing agents include, for example, imidazoles, amines, and phenolics. Although the resins are self curing, the addition of a curing agent may be useful to raise the curing rate to a commercially desirable value.

Suitable curing agents for epoxy resins include epoxy adducts of an imidazole having the formula:

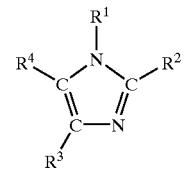

wherein $R^1$–$R^4$ are each independently hydrogen, $C_1$–$C_{12}$ alkyl, $C_6$–$C_{18}$ aryl, $C_7$–$C_{18}$ arylalkyl, $C_7$–$C_{18}$ alkylaryl, or the like. Examples of suitable imidazoles include imidazole, 2-methyl imidazole, and 2-phenyl imidazole. The imidazoles themselves are commercially available as, for example, 2-phenyl imidazole from the SKW Chemical Co. Suitable adducts of such imidazoles with a bisphenol A epoxy resin are available commercially as, for example, EPON® P-101 from Resolution, and ARALDITE® HT-3261 from Vantico. Mixtures of imidazole adducts may be used. While not wishing to be bound by any particular theory, Applicants believe that the imidazole adducts catalyze curing of epoxy resins by an opening of the epoxy ring that results in the epoxy oxygen bonding to the C=N bond of the imidazole ring. The adducted imidazole acts as a catalyst, moving from one epoxy group to another as it facilitates epoxy ring opening and cure reactions. The imidazoles are, in themselves, the operative catalysts but they tend to be insoluble in epoxy resins. Thus, adducting an imidazole to an epoxy resin increases its compatibility with the epoxy system.

Suitable curing agents for epoxy resins further include organoborate salts of the formulae:

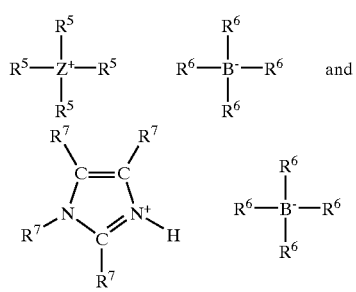

wherein Z is P, As, or N; each $R^5$ is independently $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, or the like; and each $R^6$ is independently $C_1$–$C_{12}$ alkyl, $C_6$–$C_{18}$ aryl, $C_7$–$C_{18}$ arylalkyl, $C_7$–$C_{18}$ alkylaryl, Br, Cl, I, F, or the like; and each $R^7$ is independently hydrogen, $C_1$–$C_{12}$ alkyl, $C_2$–$C_{12}$ alkenyl, $C_6$–$C_{18}$ aryl, $C_7$–$C_{18}$ arylalkyl, $C_7$–$C_{18}$ alkylaryl, $C_2$–$C_{12}$ acyl, aldehyde, carboxylate, cyano, nitro, or the like. Specific examples of these compounds and methods for their preparation are provided in U.S. Pat. No. 3,859,379 to Kitamura et al.

Suitable curing agents further include polyamine curing agents such as, for example, ethylene diamine, isophorone diamine, cyclohexylenediamine, and a fluorinated diamines such as 4,4'-hexafluoroisopropylidene bis-aniline. In a preferred embodiment, they may be converted from their usual liquid state into a friable solid that may be pulverized. A friable, solid, low-temperature curing agent may be selected from a blocked polyamine such as an adduct of an epoxy resin having an equivalent weight of from 400 to 800 AMU and an aliphatic polyamine having a primary, secondary, and/or tertiary amino group. The epoxy resin portion of the adduct may be aromatic or aliphatic, as exemplified by the bisphenol-based resins mentioned above and the aliphatic analogs thereof, respectively. The cyclohexanol analog of the bisphenol A-based resin is available under the tradename KUKDO 4100. Higher molecular weight polyamines are preferred when epoxy resins having a low equivalent weight are employed. Suitable curing agents derived from polyamines having a primary amino group are available as, for example, HT 835 from Ciba-Geigy and ANCAMINE® 2337 XS from Air Products. An epoxy adduct of an aliphatic polyamine having a secondary amino group, such as ANCAMINE® 2014 AS from Air Products, may be preferred for white and light colored coatings.

Other curing agents that can be used to enhance the curing properties include dicyandiamide or o-tolyl biguanide. A suitable dicyandiamide curing agent is sold under the tradename DYHARD® 100M by SKW Chemicals. A suitable o-tolyl biguanide curing agent is sold under the tradename CASAMINE® OTB by Swan Chemical.

Other suitable curing agents include phenolic curing agents having at least two terminal hydroxyl groups. Suitable curing agents useful in the practice of this invention are exemplified by, but are not limited to, phenolic curing agents, such as bisphenol A endcapped diglycidyl ether of bisphenol A, which is the reaction product of diglycidyl ether of bisphenol A and bisphenol A. Examples of preferred phenolic curing agents for the epoxy resin components include those sold by the Dow Chemical Company under the tradenames D.E.H.® 87, D.E.H.® 85, and D.E.H.® 84, all of which are believed to be bisphenol A endcapped diglycidyl ethers of bisphenol A. Other phenolic curing agents include phenol- and cresol-novolac curing agents sold by Georgia Pacific, Reichhold Chemicals and Ciba-Geigy. The curing agent has a hydroxy equivalent weight (HEW) of 180 to 1000 AMU. Within this range, an HEW of at least 200 AMU may be preferred. Also within this range, an HEW of up to 450 AMU may be preferred.

Mixtures of curing agents may be used. For example a phenolic curing agent may be used in combination with an imidazole such as 2-methylimidazole or 2-phenylimidazole pre-dispersed at 0.05 to 5 weight percent, based on the total curing agent.

When present, the curing agent may be used in an amount of 0.1 to 30 parts by weight per 100 parts by weight of the thermoset resin. Selection of a curing agent amount, which may be readily determined by those of ordinary skill in the art, will depend on the identity of the curing agent, the identity of the epoxy resin, and the desired properties of the cured coating, among other factors.

The composition may, optionally, comprise one or more additives known in the art. Such additives include, for example, flow control agents, dry flow agents, antioxidants, pigments, optical brighteners, extenders, combinations comprising at least one of the foregoing additives, and the like.

Examples of the flow control agents include the MODAFLOW® poly(alkyl acrylate) products available from Monsanto and the SURFYNOL® acetylenic diols (e.g., P200), available from Air Products, which contain hydroxyl, carboxyl or other functional groups. The functionalized flow additives also aid intercoat adhesion in the event that touch-up or repair of the powder coating is necessary. The flow additives may be used singly or in combination.

Flow control agents, sometimes called leveling agents, are useful to promote the formation of a continuous coating. Suitable flow control agents include polyacrylic esters, non-ionic fluorinated alkyl ester surfactants, non-ionic alkylarylpolyether alcohols, silicones, and the like, and combinations comprising at least one of the foregoing flow control agents. Flow control agents are generally liquids that have been converted to powder form by absorption onto silica-type materials. A preferred flow control agent is sold under the tradename RESIFLOW® P-67 acrylic resin by Estron Chemical, Inc., which is a 2-propenoic acid, ethyl ester polymer. Another preferred flow control agent is sold under the tradename Benzoin by DSM, Inc., which is a 2-hydroxy-1,2-diphenylethanone crystalline solid that is believed to keep the molten coating open for a suitable time to allow outgassing to occur prior to the formation of the hard set film. When present, the flow control agent may be used at an amount of 1 part by weight to 5 parts by weight, per 100 parts by weight of epoxy resin.

Suitable dry flow agents include fumed silica and fumed alumina. An example of fumed silica is sold under the tradename CAB-O-SIL® by Cabot Corporation. An example of fumed alumina is sold under the tradename Aluminum Oxide C by Degussa Corporation. When present, the dry flow agent may be used in an amount of 0.05 weight percent to 0.5 weight percent, based on the total weight of the composition.

Pigments may be used to adjust color and opacity. Suitable pigments include, for example, titanium dioxide, carbon black, phthalocyanine blue, phthalocyanine green, quinacridone red, perylene red, isoindolone yellow, dioxazine violet, scarlet 3B lake, red 188 azo red, azo pigment yellow 83, iron oxide pigments, and the like. When present, the pigment may be used in an amount of up to 100 parts by weight per 100 parts by weight epoxy resin.

The thermosetting powder coating compositions may contain as another component, an extender or filler. Suitable extenders include calcium carbonate, barium sulfate, dolomite, wollastonite, talc, mica, and the like. When present, the extender may be used in an amount up to 120 parts by weight per 100 parts by weight epoxy resin. Within this range, an extender amount of at least 10 parts by weight is preferred. Also within this range, an extender amount of up to 80 parts by weight is preferred.

Antioxidants prevent discoloration of the coatings. Suitable antioxidants include, for example, sodium hypophosphite, tris-(2,4-di-t-butyl phenyl) phosphite (available as IRGAFOS® 168 from Ciba-Geigy), calcium bis([monoethyl(3,5-di-t-butyl-4-hydroxybenzyl) phosphonate] (available as IRGANOX® 1425 from Ciba-Geigy), and the like. Mixtures of antioxidants may be used. The sodium hypophosphite may also act as a buffer against the action of trace amounts of chlorine released by epichlorohydrin residues in the epoxy resins. When present, antioxidants may be used in an amount of 0.5 to 2.0 parts by weight per 100 parts by weight of epoxy resin.

Suitable optical brighteners include, for example, 2,2'-(2, 5-thiophenediyl)bis[5-t-butylbenzoxazole, available as UVITEX® OB from Ciba-Geigy. When present, optical brighteners may be present at 0.1 to 0.5 parts by weight per 100 parts by weight of the epoxy resin.

There is no particular limitation on the method used for forming the curable composition. Preferred methods include melt mixing, in which the dry ingredients are weighed into a batch mixer and are mixed with a medium intensity horizontal plowmixer or a lesser intensity tumble mixer. Mixing times range from 1 to 3 minutes for the high intensity mixers to 30–60 minutes for the tumble mixers. The premix may then be further mixed and compounded as the resin is melted in either a single screw or a twin screw extruder for 0.5 to 1 minute. The extrudate may be cooled quickly and broken into small chips suitable for grinding.

The curable powder coating composition may be used in coating glass, ceramics, and graphite-filled composites, as well as metallic substrates such as steel and aluminum. The composition is particularly useful in the coating of heat sensitive substrates such as plastics, paper, cardboard and woods. Wood is herein defined as any lignocellulosic material, whether it comes from trees or other plants, and whether it be in its natural forms, shaped in a saw mill, separated into sheets and made into plywood, or chipped and made into particleboard, or whether its fibers have been separated, felted, or compressed. It is exemplified by lumber, panels, molding, siding, oriented strand board, hardboard, medium density fiberboard (MDF), and the like. Fiberboard having a pattern such as a simulated wood grain printed on its surface, rather than on a paper laminated to that surface, and a powder coating of this invention over said pattern has the appearance of natural wood. MDF is a particularly valuable coating substrate. Substrates may preferably have a moisture content of 3 to 10% by weight. The substrate may be treated to enhance its electrical conductivity. Thus, a porous substrate such as particleboard, pre-coated with a conductive liquid coating composition and cured, may also serve as a substrate for the coating powder. For example, a smooth 2–3 mil thick powder coating is achieved on a 0.5 to 1 mil thick UV-cured or thermally cured pre-coat. The curable powder coating composition is also useful for coating plastic parts for the interior and exterior of automobiles.

The coating powder may be applied to substrates by conventional means, including electrostatic fluidized beds, electrostatic spray guns, triboelectric guns, and the like. The coating thickness may be 1.0 mil to 25 mils. Within this range, a coating thickness of at least 1.5 mils is preferred. Also within this range, a coating thickness of up to 4 mills is preferred.

The curing temperature may be 200° F. to 500° F. Within this range, the cure temperature may preferably be at least 220° F., more preferably at least 250° F. Also within this range, the cure temperature may preferably be up to 450° F., more preferably up to 400° F. One advantage of the curable compositions is their ability to produce matte and low gloss finishes at low curing temperatures, such as curing temperatures as low as 350° F., more preferably as low as 300° F., even more preferably as low as 250° F. Another advantage of the curable compositions is their ability to produce matte and low gloss finishes over a wide range of curing temperatures. For example, such finishes may be produced over the entire temperature range of 300° to 400° F., more preferably 250° F. to 400° F.

One embodiment is a curable powder coating composition, comprising: 100 parts by weight of a bisphenol A epoxy resin; 5 to 20 parts by weight of a partially monoesterified styrene-maleic anhydride resin having a glass transition temperature less than 105° C. and an acid number of greater than 110 mg KOH/g; and 1 to 6 parts by weight of an imidazole curing agent.

Another embodiment is a cured powder coating composition, comprising the reaction product of: an epoxy thermoset resin; and a matting agent selected from styrene-maleic anhydride copolymers having a glass transition temperature less than 105° C. Another embodiment is an article comprising the above cured powder coating composition.

Another embodiment is a method of forming a cured powder coating, comprising: heating a curable powder coating composition at a temperature up to 350° F. and a time up to 60 minutes to form a cured powder coating exhibiting a 60° gloss value less than 30 units measured according to ASTM D523; wherein the curable powder composition comprises an epoxy thermoset resin, and a styrene-maleic anhydride copolymer having a glass transition temperature less than 105° C.

Another embodiment is a method of forming a cured powder coating, comprising: heating a curable powder coating composition at a temperature of 250° F. to 400° F. and a time of 1 minute to 60 minutes to form a cured powder coating exhibiting a 60° gloss value less than 30 units measured according to ASTM D523; wherein the curable powder composition comprises an epoxy thermoset resin, and a styrene-maleic anhydride copolymer having a glass transition temperature less than 105° C.; and wherein the specified gloss is obtained throughout the curing temperature range of 250° F. to 400° F.

The invention is further illustrated by the following non-limiting examples.

General Experimental

All components were obtained commercially. A diglycidyl ether of bisphenol A epoxy resin with a weight per epoxide between 650 and 725 grams was obtained as ARALDITE® GT-7013 is from Vantico. A diglycidyl ether of bisphenol A epoxy resin with a weight per epoxide between 550 and 700 grams was obtained as ARALDITE® GT-7072 from Vantico. An imidazole adduct with a diglycidyl ether of bisphenol A epoxy resin was obtained as ARALDITE® HT 3261 from Vantico. A mono-salt of a polycarboxylic acid and a cyclic amidine was obtained as VESTAGON® B68 from Creanova, Inc. An acrylic flow modifier absorbed onto silica gel was obtained as RESI-FLOW® P-67 from Estron Chemical. Inc. Barium sulfate was obtained as Barite 1075 from Polar Minerals. Carbon black pigments were obtained as Raven Black 22, Raven Black 500, Raven Black 1250 Beads, and Raven Black 1255 from Columbian Chemicals, Inc. Calcium carbonate was obtained as QUINCY WHITE® 6 from Omya.

A fumed silica was obtained as CAB-O-SIL® M5 from Cabot Corporation. A fumed alumina was obtained as Aluminum Oxide C from Degussa. A substituted dicyandiamide was obtained as DYHARD® 100M from SKW Chemicals, Inc. 2-Methyl imidazole was obtained as DYHARD® MI from SKW Chemicals, Inc. 2-Hydroxy-2-phenylacetophenone was obtained as Benzoin M is from DSM.

A partially monoesterified styrene-maleic anhydride copolymer was obtained as SMA® 1440F from Sartomer; this material has a styrene:maleic anhydride mole ratio of 1:1, a glass transition temperature of 55° C., an acid number of 165–205, 55–75% monoesterification, and melt viscosities of 300 poise at 160° C., 110 poise at 180° C., and 70 poise at 200° C. A styrene-maleic anhydride copolymer was obtained as SMA® 3000A from Sartomer; this material has a styrene:maleic anhydride mole ratio of 3:1, a glass transition temperature of 125° C., an acid number of 285, and melt viscosities of 17,300 poise at 180° C., 1,650 poise at 200° C., and 300 poise at 200° C. A partially monoesterified styrene-maleic anhydride copolymer was obtained as SMA® X.10840 from Sartomer; this material has a styrene:maleic anhydride mole ratio of 1:1, a number average molecular weight of 2,640 AMU, a weight average molecular weight of 5,600 AMU, a glass transition temperature of 85° C., an acid number of 240, 65% monoesterification, and viscosities of 1,700 poise at 160° C., 420 poise at 180° C., and 140 poise at 200° C. A partially monoesterified styrene-maleic anhydride copolymer was obtained as SMA® X.11825 from Sartomer; this material has a styrene:maleic anhydride mole ratio of 1:1, a glass transition temperature of 110° C., an acid number of 315, 25% monoesterification, a weight average molecular weight of 3,200 AMU, and a number average molecular weight of 6,800 AMU. A partially esterified styrene-maleic anhydride copolymer was obtained as SMA® 11850 from Sartomer; this material has a styrene:maleic anhydride mole ratio of 1:1, a glass transition temperature of 90° C., an acid number of 215, 50% monoesterification; a number average molecular weight of 3,800 AMU, and a weight average molecular weight of 8,300 AMU. A partially monoesterified styrene-maleic anhydride copolymer was obtained as SMA® 31890; this material has a styrene:maleic anhydride mole ratio of 3:1, a glass transition temperature of 45° C., an acid number of 110, 85% monoesterification, a number average molecular weight of 6,200 AMU, a weight average molecular weight of 15,000 AMU, and viscosities of 150 poise at 140° C., 40 poise at 160° C., and 20 poise at 180° C. A styrene-maleic anhydride copolymer was obtained as SMA® EF32 from Sartomer; this material has a glass transition temperature of 123° C., and acid number of 285, and viscosities of 1,110 poise at 160° C., 165 poise at 180° C., and 35 poise at 200° C. A styrene-acrylic acid copolymer was obtained as MOREZ® 101 from Rohm and Haas Company; this material has a glass transition temperature of 93° C. and an acid number of 205. A styrene-acrylic acid copolymer was obtained as SCX-848 from Johnson Polymers; this material has a glass transition temperature of 67° C., an acid number of 215, a number average molecular weight of 1,419 AMU, a weight average molecular weight of 4,572 AMU, and a viscosity of 23 poise at 200° C.

Unless otherwise noted, all component amounts are expressed as parts by weight.

Coating powders were prepared by initially blending by hand for 1 minute all components except the fumed alumina or fumed silica. The blend was then melt mixed in a 30 mm twin screw Baker Perkins extruder having a front zone maintained at 180° F. and an unheated rear zone. The extrudate was then chipped and ground with 0.1–0.2% by weight of fumed alumina or fumed silica to a fine powder that passed through a 140 mesh screen (U.S. Standard).

Pre-cleaned steel test panels (from "Q" Panel Co.) measuring 3"×6"×0.032" (7.6×15.2×0.08 cm) were coated using standard electrostatic spray techniques and baked in an oven at the temperatures and times specified to give a coating having thickness of 1.5 to 2.5 mils.

Forward impact resistance was measured according to ASTM G 14 using a ⅝" indenter.

Methyl ethyl ketone resistance (MEK resistance), a rating of solvent resistance and an indication of crosslink density, was measured as follows. A cotton swab was soaked in MEK and rubbed with pressure in a back and forth stroking motion 50 times. A relative rating was given on a scale of 1–5 with a rating of 5 defined as the most solvent resistant and a rating of 1 justified when the coating can be completely removed during the process to expose bare substrate. More specifically, a rating of 5 corresponds to no rub off, 4 to slight rub off, 3 to moderate rub off, 2 to severe rub off, and 1 to complete rub through to substrate.

Gloss was measured at 60° according to ASTM D523.

COMPARATIVE EXAMPLE 1

The composition of Comparative Example 1 is given in Table 1. Test results, presented in Table 4, show that a matte finish can be obtained if cure is carried out at temperatures of 300° F. or above. However, below 300° F. the coating system does not adequately cure, even when curing times are extended to 60 minutes. As a result the final surface gloss is dependent on curing temperatures varying from 10 to 100 units as temperatures vary from 250–300° F. Similar coatings are described in Product Literature from Ciba under the title, "Matting Agents/Hardeners for Powder Coatings" (1998). In this literature Ciba teaches a minimum cure schedule of 356° F. (180° C.) for 20–25 minutes.

TABLE 1

|  | Comp. Ex. 1 |
|---|---|
| ARALDITE ® GT-7013 | 100 |
| VESTAGON ® B68 | 9 |
| RESIFLOW ® P-67 | 1.4 |
| Barite 1075 | 100 |
| Raven Black 22 | 3 |
| CAB-O-SIL ® M5 | 0.1 |

EXAMPLES 1–4, COMPARATIVE EXAMPLES 2–7

The compositions of Examples 1–4 and Comparative Examples 2–7 are given in Table 2. Test results are presented in Table 4.

Comparative Example 2 lacked any reactive matting agent. High gloss was achieved at 250, 300 and 400° F. curing temperatures.

Comparative Examples 4 and 5 illustrate the use of styrene acrylic acid copolymers, which are conventional reactive matting agents used to reduce surface gloss in epoxy resins. For these Comparative Examples, 60° gloss varied significantly with cure temperature, ranging from the teens to greater that 50 units over the curing temperature range of 250–400° F.

Comparative Examples 3, 6 and 7 utilized styrene-maleic anhydride copolymers or esterified styrene-maleic anhydride copolymers as reactive matting agents. For Comparative Example 3, results show that when using SMA® 3000A a matte finish was achieved when cure reactions are carried out at a temperature of 400° F.; however, a matte finish was not achieved at temperatures less than 300° F., with the reported 60° gloss of 60 units for a curing temperature of 250° F. Results for Comparative Examples 6 and 7 show that SMA® 31890 and SMA® EF32 were not very effective matting agents even at high temperatures. For example, when curing was carried out at 400° F., 60° gloss values of 33 and 45 units were obtained with SMA® 31890 and SMA® EF32, respectively.

Examples 1–4 utilized particular partially monoesterified styrene-maleic anhydride copolymers having glass transition temperatures of 110° C. or less. Each of Examples 1–4 demonstrated the ability to provide a matte epoxy finish at cure temperatures of less than 300° F. The also provided a more consistent surface appearance when curing temperatures varied from 250 to 400° F. For instance, Example 4 provided a surface 60° gloss ranging from 3–7 units as cure temperatures ranged from 250–400° F. Over this same temperature range Examples 1–3 provided 60° gloss ranges of 6–19, 4–14, and 9–17 units, respectively.

TABLE 2

|  | C. Ex. 2 | C. Ex. 3 | C. Ex. 4 | C. Ex. 5 |
|---|---|---|---|---|
| ARALDITE ® GT-7013 | 100 | 100 | 100 | 100 |
| DYHARD ® 100 M | 4 | 4 | 4 | 4 |
| DYHARD ® MI | 0.8 | 0.8 | 0.8 | 0.8 |
| RESIFLOW ® P-67 | 2 | 2 | 2 | 2 |
| Benzoin M | 0.8 | 0.8 | 0.8 | 0.8 |
| Barite 1075 | 20 | 20 | 20 | 20 |
| Raven 1255 | 4 | 4 | 4 | 4 |
| SMA ® 3000 A | — | 20 | — | — |
| MOREZ ® 101 | — | — | 20 | — |
| SCX-848 | — | — | — | 20 |
| Aluminum Oxide C | 0.2 | 0.2 | 0.2 | 0.2 |

|  | C. Ex. 6 | C. Ex. 7 | Ex. 1 | Ex. 2 |
|---|---|---|---|---|
| ARALDITE ® GT-7013 | 100 | 100 | 100 | 100 |
| DYHARD ® 100 M | 4 | 4 | 4 | 4 |
| DYHARD ® MI | 0.8 | 0.8 | 0.8 | 0.8 |
| RESIFLOW ® P-67 | 2 | 2 | 2 | 2 |
| Benzoin M | 0.8 | 0.8 | 0.8 | 0.8 |
| Barite 1075 | 20 | 20 | 20 | 20 |
| Raven 1255 | 4 | 4 | 4 | 4 |
| SMA ® EF 32 | 20 | — | — | — |
| SMA ® 31890 | — | 20 | — | — |
| SMA ® 10840 | — | — | 20 | — |
| SMA ® 11825 | — | — | — | 20 |
| Aluminum Oxide C | 0.2 | 0.2 | 0.2 | 0.2 |

TABLE 2-continued

|  | Ex. 3 | Ex. 4 |
|---|---|---|
| ARALDITE ® GT-7013 | 100 | 100 |
| DYHARD ® 100 M | 4 | 4 |
| DYHARD ® MI | 0.8 | 0.8 |
| RESIFLOW ® P-67 | 2 | 2 |
| Benzoin M | 0.8 | 0.8 |
| Barite 1075 | 20 | 20 |
| Raven 1255 | 4 | 4 |
| SMA ® 11850 | 20 | — |
| SMA ® 1440F | — | 20 |
| Aluminum Oxide C | 0.2 | 0.2 |

EXAMPLES 5–7, COMPARATIVE EXAMPLE 8

The compositions of Examples 5–7 and Comparative Example 8 are given in Table 3. Results are presented in Table 4. Example 5 demonstrates the use in epoxy systems of a reactive matting agent in which an imidazole adduct is used as the curing agent. In this example, the surface 60° gloss ranges from 5–9 as the curing temperature varies from 250° F. to 400° F. This same system without reactive matting agent, shown in Comparative Example 8, exhibits high gloss over the same curing temperature range. Example 6 demonstrates the ability to achieve low gloss, rather than matte, surface finishes when curing is carried out at temperatures of 250° F. by simply adjusting the level of reactive matting agent. In other words, one can select a gloss finish by simply adjusting the amount of the matting agent. A comparison of Example 5 and Example 7 illustrates the ability to obtain improved impact properties and improved insensitivity of gloss to cure temperature.

TABLE 3

|  | C. Ex. 8 | Ex. 5 | Ex. 6 | Ex. 7 |
|---|---|---|---|---|
| ARALDITE ® GT-7013 | 100 | 100 | 50 | 50 |
| ARALDITE ® GT-7072 | — | — | 50 | 50 |
| ARALDITE ® HT-3261 | 4.5 | 4.5 | 4.5 | 4.5 |
| RESIFLOW ® P-67 | 2 | 2 | 1.4 | 1.4 |
| Barite 1075 | 20 | 20 | — | — |
| QUINCY WHITE ® 6 | — | — | 30 | 20 |
| Raven Black 1255 | 4 | 4 | — | — |
| Raven Black 1250 Beads | — | — | 2 | — |
| Raven Black 500 | — | — | — | 2 |
| SMA ® 1440F | — | 20 | 9 | 15 |
| Aluminum Oxide C | 0.2 | 0.2 | 0.2 | — |
| CAB-O-SIL M5 | — | — | — | 0.1 |

TABLE 4

|  | Cure Temperature (° F.) | Cure Time (minutes) | 60° gloss units | Forward Impact (in.-lbs.) | MEK resistance (1–5 rating) |
|---|---|---|---|---|---|
| C. Ex. 1 | 400 | 15 | 2 | 100 | 4 |
|  | 375 | 15 | 3 | 100 | 3 |
|  | 350 | 30 | 3 | 100 | 3 |
|  | 300 | 45 | 10 | 60 | 2 |
|  | 275 | 60 | 42 | 20 | 2 |
|  | 250 | 60 | 100 | fail | 1 |
| C. Ex. 2 | 400 | 8 | 98 | 160 | 4 |
|  | 300 | 15 | 98 | 160 | 4 |
|  | 250 | 20 | 104 | 160 | 4 |

TABLE 4-continued

|  | Cure Temperature (° F.) | Cure Time (minutes) | 60° gloss units | Forward Impact (in.-lbs.) | MEK resistance (1–5 rating) |
|---|---|---|---|---|---|
| C. Ex. 3 | 400 | 8 | 6 | 100 | 4 |
|  | 300 | 15 | 18 | 80 | 4 |
|  | 250 | 30 | 60 | 60 | 3 |
| C. Ex. 4 | 400 | 10 | 12 | 40 | 4 |
|  | 350 | 12 | 11 | — | 4 |
|  | 300 | 15 | 15 | 20 | 4 |
|  | 275 | 20 | 25 | 40 | 3 |
|  | 250 | 30 | 65 | 60 | 2 |
| C. Ex. 5 | 400 | 8 | 17 | 40 | 4 |
|  | 350 | 12 | 21 | 40 | 4 |
|  | 300 | 15 | 29 | 40 | 3 |
|  | 275 | 20 | 40 | 20 | 3 |
|  | 250 | 30 | 57 | 20 | 2 |
| C. Ex. 6 | 400 | 8 | 45 | 40 | 4 |
|  | 300 | 15 | 39 | — | — |
|  | 250 | 30 | 58 | — | — |
| C. Ex. 7 | 400 | 8 | 33 | 60 | 4 |
|  | 300 | 15 | 38 | 60 | 4 |
|  | 250 | 30 | 60 | 40 | 3 |
| Ex. 1 | 400 | 8 | 6 | 20 | 4 |
|  | 350 | 12 | 7 | 20 | 4 |
|  | 300 | 15 | 7 | 40 | 4 |
|  | 275 | 20 | 14 | 40 | 3 |
|  | 275 | 30 | 14 | 40 | 4 |
|  | 250 | 30 | 18 | 40 | 2 |
|  | 250 | 45 | 19 | 40 | 4 |
| Ex. 2 | 400 | 8 | 4 | 20 | 4 |
|  | 350 | 12 | 4 | 20 | 4 |
|  | 300 | 15 | 5 | 40 | 3 |
|  | 250 | 30 | 14 | 20 | 2 |
| Ex. 3 | 400 | 8 | 10 | 20 | 4 |
|  | 350 | 12 | 10 | 20 | 4 |
|  | 300 | 15 | 9 | 20 | 4 |
|  | 275 | 20 | 11 | 40 | 3 |
|  | 250 | 30 | 17 | 20 | 3 |
| Ex. 4 | 400 | 8 | 3 | 40 | 4 |
|  | 350 | 12 | 3 | 40 | 4 |
|  | 300 | 15 | 3 | 40 | 3 |
|  | 275 | 20 | 4 | 40 | 3 |
|  | 250 | 30 | 7 | 40 | 2 |
|  | 250 | 45 | 6 | 80 | 3 |
| C. Ex. 8 | 400 | 8 | 98 | 160 | 5 |
|  | 350 | 12 | 99 | 160 | 5 |
|  | 300 | 15 | 97 | 160 | 5 |
|  | 275 | 20 | 97 | 160 | 4 |
|  | 250 | 30 | 96 | 160 | 4 |
| Ex. 5 | 400 | 8 | 5 | 120 | 4 |
|  | 350 | 12 | 5 | 100 | 4 |
|  | 300 | 15 | 5 | 60 | 4 |
|  | 275 | 20 | 7 | 60 | 4 |
|  | 250 | 30 | 9 | 40 | 3 |
| Ex. 6 | 250 | 30 | 30 | 140 | 4 |
| Ex. 7 | 400 | 8 | 3 | 140 | 5 |
|  | 325 | 10 | 3 | 160 | 4 |
|  | 300 | 15 | 3 | 100 | 4 |
|  | 300 | 20 | 3 | 160 | 4 |
|  | 275 | 20 | 3 | 140 | 5 |
|  | 250 | 30 | 5 | 140 | 4 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A curable powder coating composition, comprising:
    an epoxy thermoset resin; and
    a styrene-maleic anhydride copolymer having a glass transition temperature less than 105° C. and having an acid number of from 110 mg KOH/g to 210 mg KOH/g.

2. The curable powder coating composition of claim 1, wherein the thermoset resin is a bisphenol A epoxy resin.

3. The curable powder coating composition of claim 1, wherein the styrene-maleic anhydride copolymer comprises a partially monoesterified styrene-maleic anhydride resin.

4. The curable powder coating composition of claim 1, wherein the styrene-maleic anhydride copolymer has a mole ratio of styrene:maleic anhydride of 1:1 to 4:1.

5. The curable powder coating composition of claim 1, comprising 3 to 30 parts by weight of the styrene-maleic anhydride copolymer per 100 parts by weight of the epoxy thermoset resin.

6. The curable powder coating composition of claim 1, further comprising a curing agent.

7. The curable powder coating composition of claim 6, wherein the curing agent comprises an imidazole having the formula

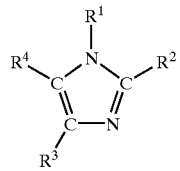

wherein $R^1$–$R^4$ are each independently hydrogen, C1–C12 alkyl, C6–C18 aryl, C7–C18 arylalkyl, and C7–C18 alkylaryl.

8. The curable powder coating composition of claim 1, further comprising an additive selected from the group consisting of flow control agents, dry flow agents, antioxidants, pigments, optical brighteners, extenders, and combinations comprising at least one of the foregoing additives.

9. The curable powder coating composition of claim 1, wherein the composition after curing exhibits a 60° gloss value less than 30 units measured according to ASTM D523.

10. The curable powder coating composition of claim 1, wherein the composition is curable at a temperature less than 300° F. to form a surface having a 60° gloss value less than 30 units measured according to ASTM D523.

11. The curable powder coating composition of claim 1, wherein curing the composition at any temperature in the range of 300° F. to 400° F. produces a 60° gloss value less than 30 units measured according to ASTM D523.

12. A curable powder coating composition, comprising:
100 parts by weight of a bisphenol A epoxy resin;
5 to 20 parts by weight of a partially monoesterified styrene-maleic anhydride resin having a glass transition temperature less than 105° C. and an acid number of greater than 110 mg KOH/g and up to 210 mg KOH/g; and
1 to 6 parts by weight of an imidazole curing agent.

13. A cured powder coating composition, comprising the reaction product of:
an epoxy thermoset resin; and
a matting agent selected from styrene-maleic anhydride copolymers having a glass transition temperature less than 105° C. and an acid number of greater than 110 mg KOH/g and up to 210 mg KOH/g; and,
a curing agent chosen from an epoxy adduct of an imidazole, 2-phenyl imidazole, and a block polyamine.

14. An article comprising the cured powder coating composition of claim 13.

15. A method of forming a cured powder coating, comprising:
heating a curable powder coating composition at a temperature up to 350° F. and a time up to 60 minutes to form a cured powder coating exhibiting a 60° gloss value less than 30 units measured according to ASTM D523;
wherein the curable powder composition comprises an epoxy thermoset resin, and a styrene-maleic anhydride copolymer having a glass transition temperature less than 105° C. and an acid number of greater than 110 mg KOH/g and up to 210 mg KOH/g; and, a curing agent chosen from an epoxy adduct of an imidazole, 2-phenyl imidazole, and a block polyamine.

16. A method of forming a cured powder coating, comprising:
heating a curable powder coating composition at a temperature of 250° F. to 400° F. and a time of 1 minute to 60 minutes to form a cured powder coating exhibiting a 60° gloss value less than 30 units measured according to ASTM D523;
wherein the curable powder composition comprises an epoxy thermoset resin, and a styrene-maleic anhydride copolymer having a glass transition temperature less than 105° C., and an acid number of from 110 mg KOH/g to 210 mg KOH/g; and
wherein the specified gloss is obtained throughout the curing temperature range of 250° F. to 400° F.

* * * * *